United States Patent [19]

Okuda et al.

[11] 4,392,385
[45] Jul. 12, 1983

[54] FLOW METER UTILIZING KARMAN VORTEX STREET

[75] Inventors: Kuniteru Okuda; Teruki Fukami, both of Tokyo; Yoshiaki Asayama, Himeji; Shunichi Wada, Himeji; Masami Kabuto, Himeji, all of Japan

[73] Assignees: Oval Engineering Co., Ltd.; Mitsubishi Denki Kabushiki Kaisha, both of Tokyo, Japan

[21] Appl. No.: 185,387

[22] Filed: Sep. 8, 1980

Related U.S. Application Data

[62] Division of Ser. No. 956,599, Oct. 30, 1978, abandoned.

[30] Foreign Application Priority Data

| Nov. 4, 1977 | [JP] | Japan | 52-148024[U] |
| Jun. 12, 1978 | [JP] | Japan | 53-80067[U] |
| Sep. 7, 1978 | [JP] | Japan | 53-123314[U] |
| Sep. 20, 1978 | [JP] | Japan | 53-129325[U] |

[51] Int. Cl.³ .............................................. G01F 1/32
[52] U.S. Cl. ..................................... 73/861.23; 73/202
[58] Field of Search ........... 73/861.22, 861.23, 861.24, 73/861.27, 861.28, 202

[56] References Cited

U.S. PATENT DOCUMENTS

| 2,515,221 | 7/1950 | Henning | 73/861.28 |
| 3,116,639 | 1/1964 | Bird | 73/861.24 |
| 3,693,438 | 9/1972 | Yamasaki et al. | 73/861.22 |
| 3,751,979 | 8/1973 | Ims | 73/861.27 |
| 3,818,877 | 6/1974 | Barrera | 73/861.23 |
| 4,041,757 | 8/1977 | Baker | 73/202 |
| 4,142,407 | 3/1979 | Kurolwa et al. | 73/861.22 |
| 4,275,590 | 1/1981 | Kawai | 73/204 |

Primary Examiner—Herbert Goldstein
Attorney, Agent, or Firm—Wenderoth, Lind & Ponack

[57] ABSTRACT

A fluid conduit with a rectangular cross-section is divided into two parallel conduits. A vortex generating rod is disposed perpendicularly to the flow direction in one of the conduits. An ultrasonic wave is directed perpendicularly across the conduit to detect the Karman vortex streets. A sound absorbing material is located along the portion of the conduit wall where the ultrasonic waves exist for preventing the formation of standing waves.

1 Claim, 6 Drawing Figures

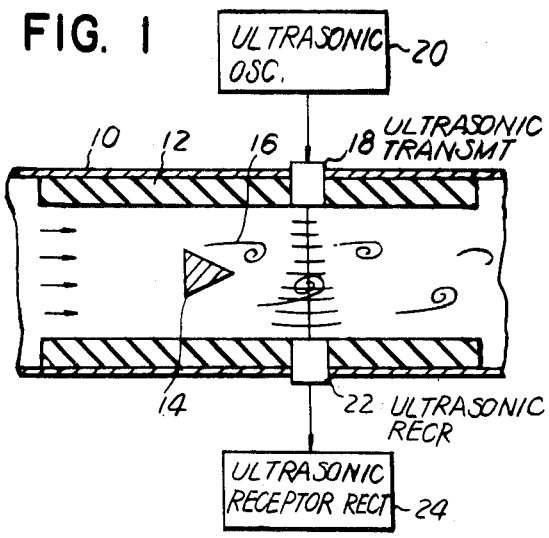

FLOW METER UTILIZING KARMAN VORTEX STREET

This application is a division of application Ser. No. 956,599, filed Oct. 30, 1978, now abandoned.

BACKGROUND OF THE INVENTION

This invention relates to a flow meter utilizing a Karman vortex street.

Flow meters utilizing the Karman vortex street include a vortex generating rod immersed in a fluid flowing through a conduit perpendicularly to the direction of flow of the fluid to generate the Karman vortex street downstream of the rod and employ an ultrasonic wave to detect the Karman vortex street thereby to measure a flow rate of the fluid. In order to detect the Karman vortex street, it has been proposed to dispose an ultrasonic transmitter and an ultrasonic receiver in opposed relationship in the conduit through which a measured fluid flows so that an ultrasonic wave transmitted from the ultrasonic transmitter is modulated by the vortices of the Karman vortex street and then received by the ultrasonic receiver. Under these circumstances the ultrasonic wave is propagated through the fluid flowing through the conduit until the same reaches, in addition to the ultrasonic receiver, that portion of the inner wall of the conduit opposite to the transmitter. Then the ultrasonic wave is reflected from the inner conduit wall and interferes with that propagated from the transmitter resulting in the formation of a standing ultrasonic wave. Alternatively, the ultrasonic wave might be reflected from the inner conduit wall a few times and then be received, as noise, by the ultrasonic receiver resulting in the disadvantage that the measurement cannot be stably made. Particularly, when the flow rate of air is being measured, the ultrasonic wave is propagated through the air at a propagation velocity which changes with a change in the air temperature. If the ultrasonic wave being used has a constant frequency, then this change in propagation velocity is attended by a variation in the wavelength thereof. This has resulted in the disadvantage that a standing ultrasonic wave is formed at a certain temperature of the air which causes the ultrasonic receiver not to receive in a normal fashion the ultrasonic wave transmitted from the ultrasonic transmitter.

Since the ultrasonic wave transmitted by the ultrasonic transmitter is propagated through the flowing fluid as above described, if there is a long distance between the ultrasonic transmitter and receiver, this is disadvantageous in that the ultrasonic receiver is not only faint but also drifts with the flowing fluid so as to be attenuated.

Accordingly, it is an object of the present invention to provide a new and improved flow meter utilizing a Karman vortex street to measure the flow rate of a fluid over a wide range and at temperatures extending from a low to an elevated temperature.

SUMMARY OF THE INVENTION

The present invention provides a flow meter utilizing a Karman vortex street and comprising a conduit having a measured fluid flowing therethrough, a vortex generation member disposed perpendicularly to the direction of flow of the fluid within the conduit to generate a Karman vortex street downstream thereof, a vortex detector disposed in the conduit and utilizing an ultrasonic wave to detect the number of vortices of the Karman vortex street generated in a unit time, and a sound absorbing material for absorbing and attenuating the ultrasonic wave forming at least at the inner wall of the conduit.

BRIEF DESCRIPTION OF THE DRAWINGS

The present invention will become more readily apparent from the following detailed description taken in conjunction with the accompanying drawings in which:

FIG. 1 is a fragmental longitudinal section view of one embodiment of a flow meter according to the present invention with some parts illustrated in block form;

FIG. 2 is a cross-sectional view of the ultrasonic receiver shown in FIG. 1;

FIG. 3 is a view similar to FIG. 1 but illustrating a modification of the flow meter of the present invention;

FIG. 4 is a cross-sectional view of the arrangement shown in FIG. 3;

Throughout the figures like reference numerals designate the identical or corresponding components.

DESCRIPTION OF THE PREFERRED EMBODIMENTS

Figure 5:
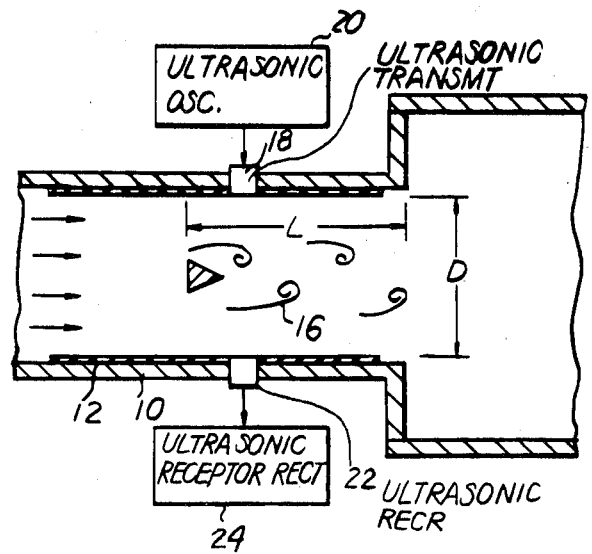
FIG. 5 is a view similar to FIG. 1 but illustrating another modification of the flow meter of the present invention.

Referring now to FIG. 1 of the drawings, there is illustrated on embodiment of a flow meter of the present invention utilizing a Karman vortex street. The arrangement illustrated comprises a conduit 10 lined with a sound absorbing material 12 which absorbs and attenuates ultrasonic waves and having a measured fluid flowing therethrough in the direction of the arrow shown in FIG. 1. The sound absorbing material 12 forms the inner wall of the conduit 12. Suitable examples of the sound absorbing materials are unwoven fabrics, glass work, foamed polyethylenes, foamed styrene, synthetic leathers, etc.

A vortex generating rod 14 having a cross-section in the form of a regular triangle is fixedly secured perpendicularly to the direction of flow of the fluid within the conduit 10 with one side of the regular triangle located at right angles to the direction of flow of the fluid upstream of the longitudinal axis of the rod 14. Thereby the vortex generating rod 14 generates a Karman vortex street 16 downstream thereof.

An ultrasonic transmitter 18 is disposed on the conduit 10 immediately downstream of the vortex generating rod 14 so that the ultrasonic transmitting surface thereof is flush with the inner surface of the sound absorbing material 12 or inner wall surface of the conduit 10 exposed to the flowing fluid. The transmitter 18 is connected to an ultrasonic oscillator 20. An ultrasonic receiver 24 is disposed on the conduit 10 directly opposite to the ultrasonic transmitter 18 with the ultrasonic receiving surface thereof similarly flush with the inner wall surface of the conduit 10 exposed to the flowing fluid. The receiver 22 is connected to an ultrasonic receptor 24.

The ultrasonic receiver 22 preferably has the structure shown in FIG. 2. As shown in FIG. 2, the ultrasonic receiver 22 comprises an electrically insulating base plate 30, a plurality of supporting rods 32 (only two of which are illustrated) formed of a resilient material such as rubber and mounted on the base plate 30 and a bimorph type ultrasonic vibrator 34 supported to the supporting rods 32. A hollow inverted cone 36 is connected at the apex to the ultrasonic wave-receiving surface of the ultrasonic vibrator 34. The cone 36 forms a resonator for the ultrasonic wave involved and serves as a combined deflecting and reflecting member. The vibrator 34 is electrically connected to the ultrasonic receptor 24 (see FIG. 1) through a pair of electrodes 38 sealed in and extending through the base plate 30.

The assembly formed as above described is surrounded by a housing 40 and the base plate 30 is connected in sealed relationship to the open end of the housing 42 for completing the ultrasonic receiver 22. The resonator 36 has the larger diameter end facing an ultrasonic wave-receiving surface disposed on the other or closed end of the housing 42.

In operation the measured fluid, for example, air, flows through the interior of the conduit 10 in the direction of the arrow shown in FIG. 1 and the vortex generating rod 14 partly obstructs the flowing fluid to generate the Karman vortex street 16 downstream thereof. On the other hand, the ultrasonic transmitter 18 driven by the ultrasonic oscillator 20 transmits an ultrasonic wave through the flowing fluid perpendicularly to the direction of the flow of the fluid and toward the ultrasonic receiver 22. While the ultrasonic wave is propagated through the flowing fluid it is modulated by the vortices of the Karman vortex street and then the modulated ultrasonic wave is received by the ultrasonic receiver 22 and is converted to a corresponding electrical signal. This electrical signal is applied to the ultrasonic receptor 24. The ultrasonic receptor 24 detects the number of vortices of the Karman vortex street generated in a unit time thereby to measure the flow rate of the fluid in the manner well known in the art.

As above described, the ultrasonic wave emitted from the ultrasonic transmitter 18 propagates through the flowing fluid while being directed thereinto. Accordingly, the ultrasonic wave reaches, in addition to the ultrasonic receiver 22, that portion of the inner wall surface of the conduit 10 located adjacent to the receiver 22. However, since that inner wall surface is formed in the sound absorbing material 12, it does not reflect the ultrasonic wave. As a result, a stable measurement can be effected without the generation of reflected ultrasonic waves and a standing ultrasonic wave due to the latter.

It will readily be understood that the sound absorbing material 12 is required only to be applied to that portion of the inside of the conduit 10 having the ultrasonic waves falling thereon. This is because the particular ultrasonic wave should be prevented from interferring with reflected ultrasonic waves.

The arrangement illustrated in FIGS. 3 and 4 comprises a conduit with a rectangular cross-sectional profile divided into a pair of parallel conduit portions 10 and 50 each having a substantially identical cross-sectional shape transverse to the longitudinal axis thereof. Only the conduit portion 10 includes the components 12, 14, 18, 20 and 22 as shown in FIG. 1 with a laminar flow producing means in the form of a rectifier 26 being disposed at the inlet thereof.

The flow rate of the fluid flowing through the conduit portion 10 is measured in the manner as above described in conjunction with FIG. 1 and the overall flow rate of the fluid flowing through both conduit portions 10 and 50 can be determined by the measured flow rate.

The arrangement shown in FIGS. 3 and 4 is advantageous over that shown in FIG. 1 in that in FIGS. 3 and 4 the distance between the ultrasonic transmitter and receiver 18 and 22 can be reduced to permit the use of a low power ultrasonic wave. Further the amount of sound absorbing material 12 can be reduced because of a decrease in area over which the particular ultrasonic wave reaches the inner wall surface of the conduit portion 10.

If desired, the conduit may be divided into more than two conduit portions only one of which is constructed substantially as illustrated in FIG. 1.

The arrangement illustrated in FIG. 5 is different from that shown in FIG. 1 only in that, in FIG. 5, the conduit 10 is connected at the downstream end to an expanded pipe 52 having a transverse dimension greater than that of the conduit 10.

The conduit 10 has previously been required to include a portion in the form of a straight pipe extending downstream of the vortex generating rod 14 a distance L (see FIG. 5) equal to at least five times the transverse dimension D thereof (see FIG. 5). In the arrangement of FIG. 5, however, this length L can be equal to or smaller than twice the transverse dimension D. This results in a decrease in the overall dimension of the resulting flow meter.

In the arrangement of FIG. 5 it is seen that the ultrasonic wave from the transmitter 18 may reach the inner wall of the expanded pipe 52. It has been found, however, that the ultrasonic wave reflected from the inner wall of the expanded pipe 52 almost completely decays after it enters into the conduit 10 and before it reaches the ultrasonic receiver 22. As a result, the expanded pipe 52 does not adversely affect the measurement of the flow rate.

Figure 6:
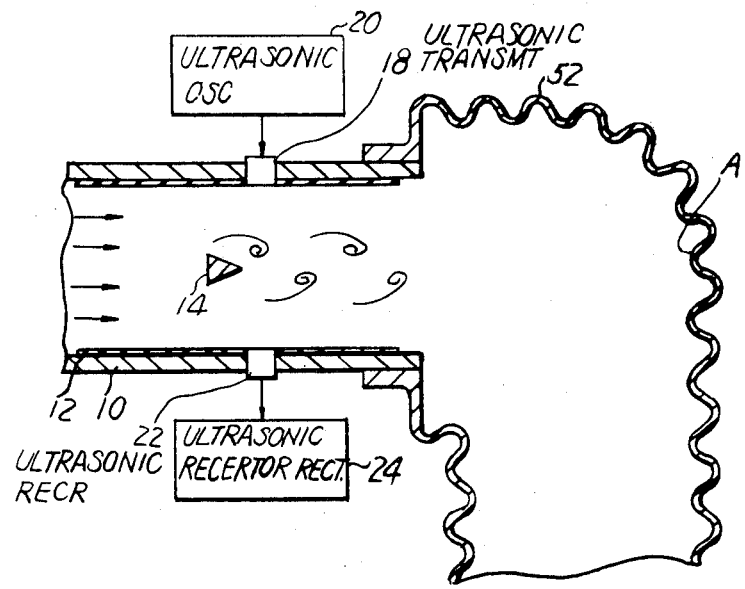
FIG. 6 is a view similar to FIG. 1 but illustrating a modification of the arrangement shown in FIG. 5.

It is is desired to bend the expanded pipe 52 downstream of the straight portion of the conduit 10 then the bent portion thereof can have the inner wall irregularly corrugated as shown by the reference character A in FIG. 6. The irregularly corrugated walls 56 difusely reflect the ultrasonic wave incident thereupon to prevent the ultrasonic wave reflected from the inner wall of the expanded pipe 52 from directly reaching the ultrasonic receiver 20.

From the foregoing it is seen that the present invention provides a flow meter utilizing the Karman vortex street which prevents a transmitted ultrasonic wave from reflecting from an inner wall of a conduit containing the flow being measured and therefore prevents a standing ultrasonic wave from being formed within the conduit due to the reflection of the ultrasonic wave.

Further the ultrasonic receiver shown in FIG. 2 is advantageous in that the inverted cone-shaped resonator is operable to diffuse and reflect the ultrasonic wave from the transmitter reaching the same but not directly toward the transmitter thereby preventing a standing ultrasonic wave from being formed due to the ultrasonic wave from the transmitter interferring with that reflected from the inverted cone-shaped resonator.

Therefore it is seen that the inverted cone-shaped resonator 36 cooperates with the sound absorbing material 12 to permit a more accurate measurement of the flow rate.

While the present invention has been illustrated and described in conjunction with a few preferred embodiments thereof it is to be understood that numerous changes and modifications may be resorted to without departing from the spirit and scope of the present invention. For example, the conduit may be formed of the sound absorbing material as above described. Also the resonator 36 is not required to be in the form of a hollow inverted-cone and it may be irregularly corrugated or wedge-shaped so as to reflect diffusely the ultrasonic wave falling thereon. Further a net of suitable meshes may be disposed in front of both the ultrasonic transmitter and receiver and the hollow inverted cone-shaped resonator can be omitted.

What we claim is:

1. A flow meter utilizing a Karman vortex street and comprising a conduit with a rectangular cross-sectional profile and divided into at least two parallel conduit portions through which a fluid to be measured flows, said at least two parallel conduit portions being substantially identical in transverse cross-sectional shape to each other, a laminar flow producing means in the upstream end of one of said conduit portions, a vortex generating member disposed in said one conduit portion perpendicularly to the direction of flow of the fluid to generate the Karman vortex street downstream thereof, a vortex detector disposed on said one conduit portion and directing an ultrasonic wave perpendicularly across the Karman vortex street and receiving the ultrasonic wave to detect the number of vortices of the Karman vortex street generated in a unit time, said vortex detecting generating an ultrasonic wave of the type which, unless preventive measures are taken, tends to generate a standing wave at the receiving side of said one conduit portion, and a sound absorbing material only on the inner wall of said one conduit portion at least along the portion where the ultrasonic waves exist for preventing the generation of a standing wave due to reflection of the said ultrasonic waves, whereby the flow rate of said fluid flowing through said plurality of conduit portions can be determined from measuring the flow rate of the portion of said fluid flowing through said one of said conduit portions.

* * * * *